US012668254B2

(12) United States Patent
Abe et al.

(10) Patent No.: US 12,668,254 B2
(45) Date of Patent: Jun. 30, 2026

(54) MAP UPDATE SYSTEM, IN-VEHICLE DEVICE, AND SERVER

(71) Applicant: DENSO CORPORATION, Kariya-city (JP)

(72) Inventors: Shinya Abe, Kariya-city (JP); Satoshi Horihata, Kariya-city (JP); Tomohito Terazawa, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 150 days.

(21) Appl. No.: 18/588,737

(22) Filed: Feb. 27, 2024

(65) Prior Publication Data

US 2024/0199040 A1 Jun. 20, 2024

Related U.S. Application Data

(63) Continuation of application No. PCT/JP2022/032663, filed on Aug. 30, 2022.

(30) Foreign Application Priority Data

Sep. 3, 2021 (JP) ................................. 2021-144044

(51) Int. Cl.
*B60W 50/029* (2012.01)
*B60W 50/02* (2012.01)
*G01C 21/00* (2006.01)

(52) U.S. Cl.
CPC ...... *B60W 50/029* (2013.01); *B60W 50/0205* (2013.01); *G01C 21/3804* (2020.08); *B60W 2050/021* (2013.01); *B60W 2050/0215* (2013.01); *B60W 2556/40* (2020.02); *B60W 2556/45* (2020.02)

(58) Field of Classification Search
CPC ....... B60W 2556/40; B60W 2050/143; B60W 2050/146; B60W 2556/50; B60W 50/14; B60W 60/0053; B60W 2050/021; B60W 2050/0215; B60W 2556/45; B60W 50/0205; B60W 50/029; G01C 21/32; G01C 21/3844; G01C 21/387; G01C 21/3889; G01C 21/3896; G01C 21/3804; H04L 67/06; H04W 4/021; H04W 4/40; H04W 4/44; G09B 29/00
See application file for complete search history.

(56) References Cited

U.S. PATENT DOCUMENTS

| | | | |
|---|---|---|---|
| 10,942,031 B2 | 3/2021 | Koda et al. | |
| 2017/0122749 A1 | 5/2017 | Urano et al. | |
| 2019/0316915 A1 | 10/2019 | Koda et al. | |
| 2020/0317192 A1 | 10/2020 | Awane et al. | |
| 2021/0156698 A1 | 5/2021 | Koda et al. | |
| 2021/0180979 A1 | 6/2021 | Kitahara | |
| 2022/0268587 A1* | 8/2022 | Konishi | ............. G01C 21/3859 |

* cited by examiner

*Primary Examiner* — Wade Miles
*Assistant Examiner* — Jerrod Irvin Davis
(74) *Attorney, Agent, or Firm* — Precision Patents, P.C.

(57) ABSTRACT

By a map update system, an in-vehicle device, or a server, it is determined whether a failure is in vehicle control executed by a vehicle controller configured to control behavior of a vehicle using map information stored in a storage mounted on the vehicle. Further, the map update system or the server, it is determined to whether to update the map information.

17 Claims, 6 Drawing Sheets

Figure 5:
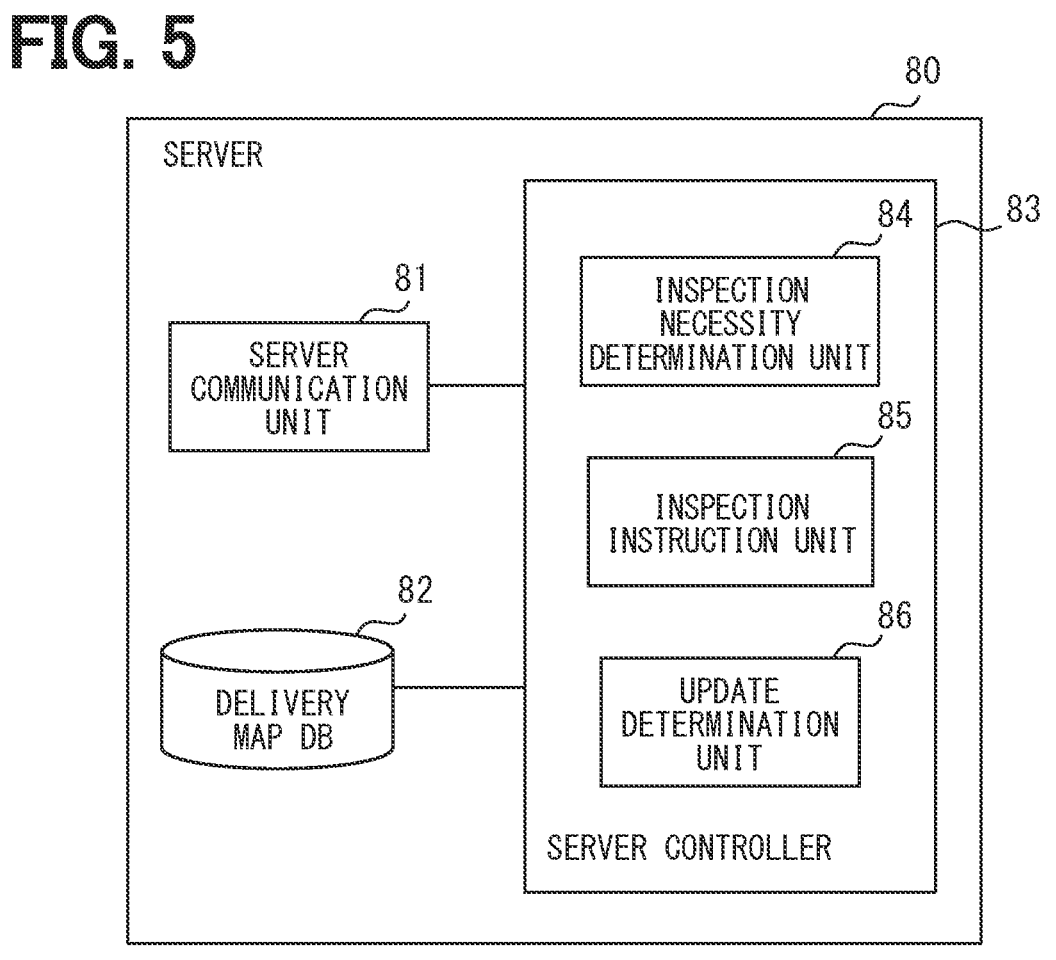

SERVER

83

81

SERVER
COMMUNICATION
UNIT

82

DELIVERY
MAP DB

84

INSPECTION
NECESSITY
DETERMINATION UNIT

85

INSPECTION
INSTRUCTION UNIT

86

UPDATE
DETERMINATION
UNIT

SERVER CONTROLLER

MAP UPDATE SYSTEM, IN-VEHICLE DEVICE, AND SERVER

CROSS REFERENCE TO RELATED APPLICATIONS

The present application is a continuation application of International Patent Application No. PCT/JP2022/032663 filed on Aug. 30, 2022, which designated the U.S. and claims the benefit of priority from Japanese Patent Application No. 2021-144044 filed on Sep. 3, 2021. The entire disclosures of all of the above applications are incorporated herein by reference.

TECHNICAL FIELD

The present disclosure relates to a map update system, an in-vehicle device with the map update system, and a server.

BACKGROUND

A device of a comparative example compares a position, shape, and the like of a feature detected by an external field sensor mounted on a vehicle with feature information stored in a storage as map data. When it is determined that there is a change in the feature detected by the external field sensor, the difference information is transmitted to a server. The server updates an advanced map database based on the difference information.

SUMMARY

By a map update system, an in-vehicle device, or a server, it is determined whether a failure is in vehicle control executed by a vehicle controller configured to control behavior of a vehicle using map information stored in a storage mounted on the vehicle. Further, the map update system or the server, it is determined to whether to update the map information.

BRIEF DESCRIPTION OF DRAWINGS

FIG. 5 is a diagram showing a configuration of a server 80.

DETAILED DESCRIPTION

Figure 1:
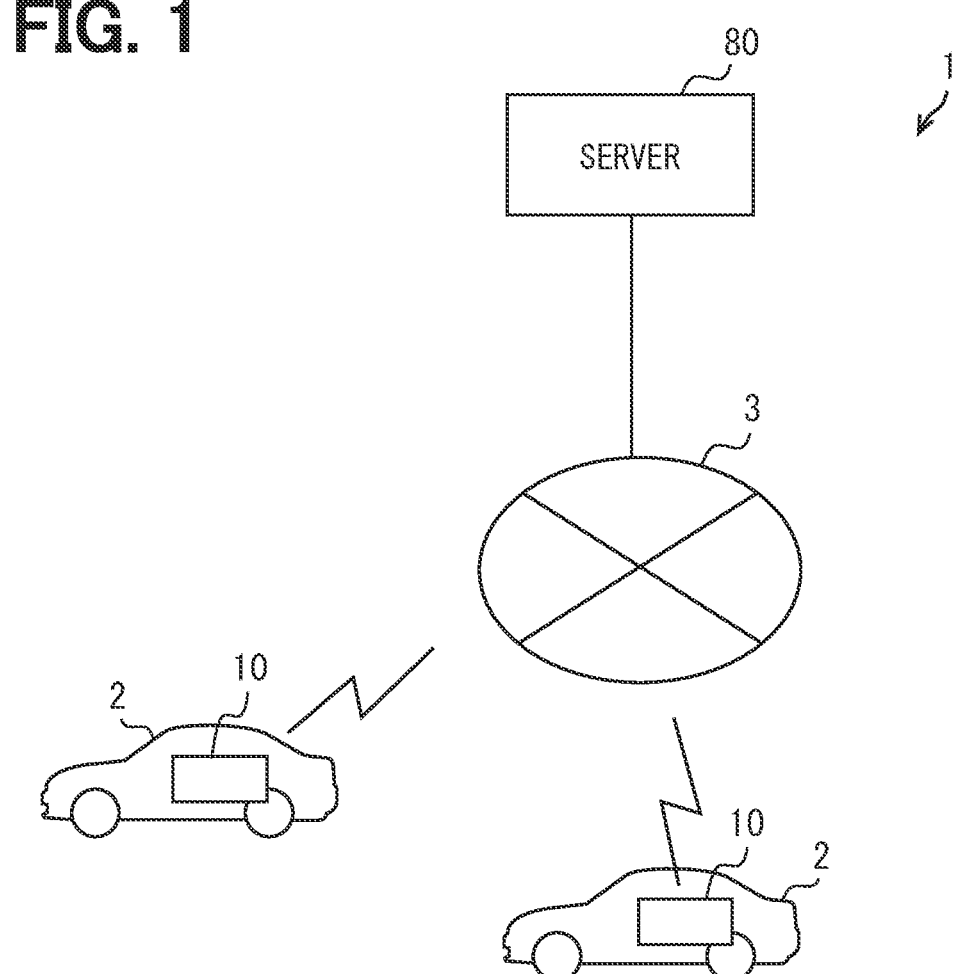
FIG. 1 is a diagram showing an overall configuration of a map update system 1 according to an embodiment.

In the comparative example, when the feature information in the advanced map database differs from the position and shape of the map detected by a sensor mounted on a vehicle that actually traveled a site, the advanced map database is updated. However, even when the map information does not accurately represent actual roads, features, and the like, it may not be necessary to update the map information. When the map information is used to control vehicle behavior, it may not be necessary to update the map information as long as it does not affect the vehicle control. When the map information is constantly updated even though it is not essential, the effort required to update the map information may increase.

On example of the present disclosure provides a map update system, an in-vehicle device, and a server that can prevent an update of non-essential map information.

According to one example embodiment of the present disclosure for achieving the above object, a map update system determines whether an update of map information that is stored in a storage of a vehicle and used by a vehicle controller configured to control behavior of the vehicle is necessary, and includes: a failure determination unit configured to determine whether a failure is in vehicle control executed by the vehicle controller; and an update determination unit configured to determine that the update of the map information is necessary based on determination that a cause of the failure is in the map information.

This map update system determines that the update of the map information is necessary based on determination that a cause of the failure of the vehicle control executed by the vehicle controller is in the map information. Therefore, when there is no failure in the vehicle control executed by the vehicle controller, it can be determined that the update of the map is not necessary even if the map is not the latest. Accordingly, it is possible to prevent the non-essential update of the map information.

Further, the above-described map update system can be implemented according to the following specific aspects.

The map update system includes: a plurality of in-vehicle devices that include the failure determination unit and is mounted on the plurality of vehicles; and a server that includes the update determination unit and communicates with each of the in-vehicle devices. The failure determination unit is configured to transmit, to the server from a vehicle communication unit, failure determination result information indicating whether the failure is in the vehicle control. The server includes: an inspection necessity determination unit configured to determine whether to inspect a cause of the failure based on the failure determination result information received from the vehicle; and an inspection instruction unit configured to transmit, to at least one in-vehicle device among the plurality of in-vehicle devices, an inspection instruction for instructing the at least one in-vehicle device to inspect the cause of the failure when the inspection necessity determination unit determines to inspect the cause of the failure. The in-vehicle device includes an inspection unit configured to, when receiving the inspection instruction, compare the map information stored in the storage with recognition map information generated based on information detected by a periphery detection sensor mounted on the vehicle to determine, for inspection, whether the map information stored in the storage is correct, and transmit an inspection result from the vehicle communication unit to the server. The update determination unit is configured to determine whether the update of the map information is necessary based on the inspection result transmitted from the vehicle.

This map update system is provided with the in-vehicle device and server.

That is, the in-vehicle device includes a failure determination unit configured to determine whether a failure is in vehicle control executed by a vehicle controller configured to control behavior of a vehicle using map information stored in a storage of the vehicle, and transmit failure determination result indicating a determination result from a vehicle communication unit to a server; and an inspection unit configured to, when receiving the inspection instruction from the server, compare the map information stored in the storage with recognition map information generated based on information detected by a periphery detection sensor mounted on the vehicle to determine, for inspection, whether the map information stored in the storage is correct, and transmit an inspection result from the vehicle communication unit to the server.

Further, the server includes an inspection necessity determination unit configured to receive failure determination result information that is information indicating a determination result of whether a failure is in vehicle control by a vehicle controller configured to control behavior of a vehicle using map information stored in a storage mounted on the vehicle; and an inspection instruction unit configured to transmit, to at least one in-vehicle device among the plurality of in-vehicle devices, an inspection instruction for instructing the at least one in-vehicle device to inspect the cause of the failure when the inspection necessity determination unit determines to inspect the cause of the failure; and an update determination unit configured to, when receiving statistically process the failure determination result from the plurality of vehicles, determine whether the cause of the failure is in the map information, and determine to update the map information based on determination that the cause of the failure is in the map information.

Hereinafter, an embodiment will be described with reference to the drawings. FIG. 1 is a diagram showing an overall configuration of a map update system 1 according to an embodiment. The map update system 1 includes an in-vehicle system 10 mounted on a vehicle 2 and a server 80 installed at an arbitrary position outside the vehicle 2. The in-vehicle system 10 and the server 80 can communicate via a communication network 3.

Configuration of In-Vehicle System 10

Figure 2:
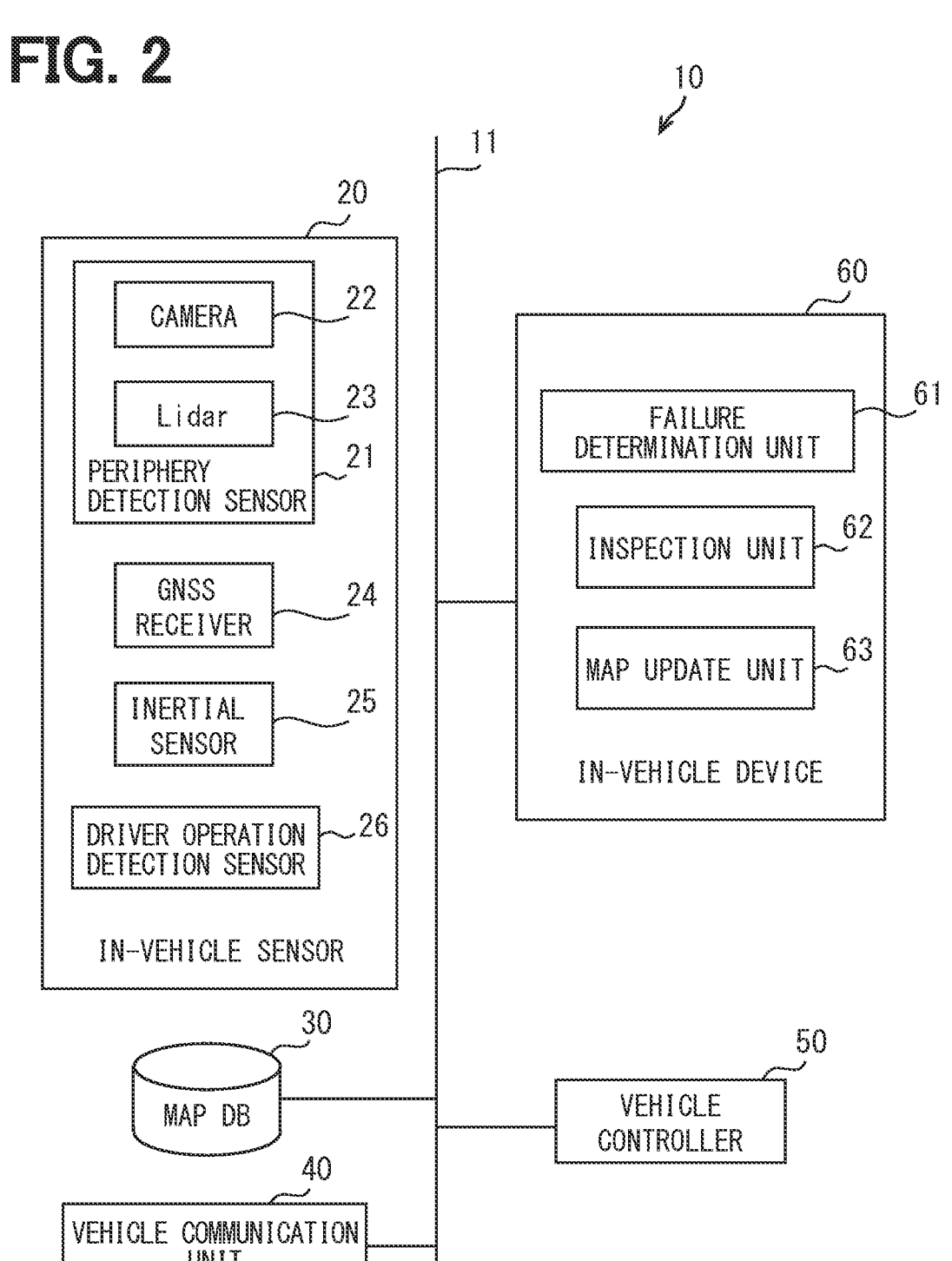
FIG. 2 is a diagram showing a configuration of an in-vehicle system 10.

FIG. 2 is a diagram showing a configuration of the in-vehicle system 10. The in-vehicle system 10 includes an in-vehicle sensor 20, a storage 30, a vehicle communication unit 40, a vehicle controller 50, and an in-vehicle device 60. These are connected to an in-vehicle LAN 11 and communicate with each other via the in-vehicle LAN 11.

The in-vehicle sensor 20 is a sensor mounted on the vehicle 2 to detect various information used for vehicle control. The in-vehicle sensor 20 includes a periphery detection sensor 21, a GNSS receiver 24, an inertial sensor 25, and a driver operation detection sensor 26. In addition to this, the in-vehicle sensor 20 may include other sensors such as a sensor that detects a driver state.

The periphery detection sensor 21 is a sensor that detects various objects existing in the periphery of the vehicle 2. The objects also include planar objects such as lane markings. In FIG. 2, a camera 22 and a lidar 23 are shown as the periphery detection sensor 21. The camera 22 captures an image in front of the vehicle 2. Further, the camera 22 may capture the sides and rear of the vehicle 2. The lidar 23 detects an object position in the periphery of the vehicle 2 by projecting and receiving light. In addition to or in place of these, periphery detection sensor 21 may include other sensors that detect objects existing in the periphery of the vehicle 2, such as a millimeter wave radar. The periphery detection sensor 21 may detect objects in the periphery of the vehicle using one or a combination of camera, lidar, millimeter wave radar, and the like.

The GNSS receiver 24 receives a navigation signal transmitted by a navigation satellite included in the GNSS (Global Navigation Satellite System), which is a satellite navigation system, and sequentially calculates the current position based on the received navigation signal. The inertial sensor 25 is a sensor that detects inertia generated in the vehicle 2, and includes one or both of an acceleration sensor and an angular velocity sensor. The GNSS receiver 24 and the inertial sensor 25 are sensors for sequentially detecting the current position of the vehicle 2. Since a change in the current position indicates the behavior of the vehicle 2, the GNSS receiver 24 and the inertial sensor 25 are sensors that detect information indicating the behavior of the vehicle 2.

The driver operation detection sensor 26 is a sensor that detects input operations performed by a driver to change or maintain the behavior of the vehicle 2. The driver operation detection sensor 26 is an accelerator sensor, a brake sensor, a steering sensor, a shift position sensor, or the like.

The storage 30 is writable and stores various information. The storage 30 may be provided by a flash memory. The storage 30 stores a map database (hereinafter referred to as map DB). The map DB includes map information called a high-precision map. The high-precision map is a three-dimensional map and includes information about features existing in the periphery of the road. The features include traffic lights and road signs. The high-precision map contains more detailed information than less-precision maps used for route searching, the information being related to not only three-dimensional information but also two-dimensional information such as a position of the lane marking.

The vehicle communication unit 40 is a communication unit that performs wireless communication, and communicates with the server 80 via the communication line network 3.

The vehicle controller 50 acquires at least one of information indicating the behavior of the vehicle 2 or information indicating objects existing in the periphery of the vehicle 2 from the in-vehicle sensor 20. The vehicle controller 50 also acquires information from the map DB stored in the storage 30. The vehicle controller 50 uses the acquired information to execute one or more types of vehicle control to control the behavior of the vehicle 2. The vehicle controller 50 can be implemented by a configuration including at least one processor.

An example of the vehicle control is traffic light stop control. The signal stop control is a control for stop at a stop line when the target traffic light is red and the vehicle is not traveling in a traveling lane in a direction indicated by an arrow light. When a plurality of traffic lights can be detected by the periphery detection sensor 21, which traffic light is the target traffic light is determined based on the position and direction of the traffic light with respect to the vehicle 2. The map DB includes information (hereinafter referred to as traffic light information) specifying the coordinates, shape, size, and the like of the traffic light. In the signal stop control, a target traffic light is specified from the traffic light detected using the periphery detection sensor 21 using the traffic light information stored in the map DB. Then, it is determined which light of the specified target traffic light is lit.

Another example of the vehicle control is lane keeping control. The lane keeping control is control in which the vehicle 2 automatically travels in the same lane while sequentially detecting the position of the lane marking and the vehicle 2 in the vehicle width direction. The lane keeping control is performed on the condition that the deviation between the position and shape of the lane marking recognized using the periphery detection sensor 21 and the position and shape of the lane marking in the map DB is within an allowable range. This is to check whether the lane marking recognized by the periphery detection sensor 21 is correct and then control the vehicle.

Note that a target trajectory determined from the lane marking recognized using the periphery detection sensor 21 may be compared with a target trajectory determined from the lane marking in the map DB. When both the left and right lane markings of the vehicle 2 have been recognized, the target trajectory can be set to a trajectory that indicates the middle of the left and right lane markings, that is, the center in the lane width direction. This is because even when the target trajectories are compared, similar determination can be made to those obtained by comparing the lane markings.

In addition, the lane keeping control may be performed on the condition that the target trajectory determined from the lane marking recognized using the periphery detection sensor 21 does not intersect with lane marking in the map DB. The control is performed for preventing the vehicle 2 from crossing the lane marking even when the lane keeping control is executed while allowing the position and shape of the lane marking recognized using the periphery detection sensor 21 to be slightly different from the position and shape of the lane marking in the map DB.

Another example of the vehicle control is lane change control. The lane change control is control for controlling the vehicle 2 that crosses the lane marking in a road section with the lane marking having a type that allows a lane change, and changing the lane in which the vehicle 2 is traveling. The lane change control compares the position and shape of the lane marking recognized using the periphery detection sensor 21 with the position and shape of the lane marking in the map DB. In addition, the lane change control also checks whether the line type recognized from the signal detected by the periphery detection sensor 21 is the line type of the lane marking in the map DB. This is because the recognized lane marking may be faint and recognized as a broken line, but in the map database it may be a solid line, or an yellow line may be mistakenly recognized as a white line due to color misrecognition. In some cases, the map DB may be incorrect and the yellow line may have been changed to a white line.

The vehicle control executed by the vehicle controller 50 is not limited to the specific control described above, and may be other controls such as constant speed traveling control, inter-vehicle distance control, automatic parking control, and the like. The vehicle controller 50 executes one or more types of vehicle control.

The in-vehicle device 60 is implemented by a configuration which includes at least one processor. For example, the in-vehicle device 60 may be implemented by a computer including a processor, a non-volatile memory, a RAM, an I/O, and a bus line connecting these components. The non-volatile memory stores a program that operates a general-purpose computer as the in-vehicle device 60. The in-vehicle device 60 operates as a failure determination unit 61, an inspection unit 62, and a map update unit 63 by the processor executing the program stored in the nonvolatile memory while utilizing the temporary storage function of the RAM. Execution of the operations corresponds to execution of a method implemented by the program.

The failure determination unit 61 determines whether there is a failure in the vehicle control executed by the vehicle controller 50 for each type of vehicle control. Five specific conditions for determining the failure will be described. The failure determination unit 61 may use any one of the five conditions described below, or may use a combination of two or more conditions.

The first condition is that the driver of the vehicle 2 performs a vehicle operation that changes the vehicle control by the vehicle controller 50. The first condition will be specifically explained. In the case of signal stop control, when the vehicle 2 is stopped due to the driver's brake operation before the position where the vehicle 2 is scheduled to stop under the signal stop control, it can be determined that there is the failure in the signal stop control. On the contrary, when the driver operates the accelerator while the vehicle controller 50 is decelerating the vehicle 2 in order to stop the vehicle 2 by the signal stop control, it may be determined that there is the failure in the signal stop control. In the case of lane keeping control, when the position in the vehicle width direction is changed by a predetermined distance or more due to a driver's steering wheel operation, it can be determined that there is the failure in the lane keeping control. The predetermined distance may be a distance for changing lanes, or may be a distance for adjusting the position within one lane. In the case of lane change control, when the driver returns the lateral position of the vehicle 2 by operating the steering wheel while changing lanes using the lane change control, it may be determined that there is the failure in the lane keeping control.

In the case of constant speed traveling control, when the driver changes the shift position, it may be determined that there is the failure in the constant speed traveling control. Further, when the driver operates the operation unit to forcibly end the vehicle control during the execution of these vehicle controls, it may be determined that there is the failure in the vehicle control that the driver ended. The correspondence between a specific vehicle control and a driver operation that determines that there is the failure in the vehicle control is set in advance.

The second condition for determining the failure is a case where map-based control information and sensor-based control information are different. The map-based control information is information used for the vehicle control, and is control information determined using information included in the map DB. In the case of traffic light stop control, traffic light information such as the position of the traffic light is used for the control. The traffic light information in the map DB is an example of the map-based control information.

The details of the traffic light information will be described. The traffic light information can include one or more of the coordinates, shape, size, direction, light arrangement, number of lights, light color, light shape, and light lighting pattern of the traffic light. When this traffic light information is used as the map-based control information, corresponding information is acquired using the periphery detection sensor 21. The acquired information is the sensor-based control information.

In determining whether the map-based control information and the sensor-based control information are different, when the difference can be considered an error, it is not determined that they are different. Whether the map-based control information and the sensor-based control information are different is determined by, for example, whether the difference between the map-based control information and the sensor-based control information exceeds a preset threshold.

The map-based control information may be generated by processing information in the map DB. For example, in the lane keeping control, a target trajectory determined from the lane marking in the map DB is an example of map-based control information that is generated by processing information in the map DB. The sensor-based control information is information used for vehicle control, and is control information determined using information detected by the periphery detection sensor 21. For example, the position and shape of lane marking recognized using the periphery detection sensor 21 is the sensor-based control information.

The third condition for determining the failure is that the information output by one or more in-vehicle sensors 20 used by the vehicle controller 50 to control the vehicle is an error. Examples of cases where the information output by the in-vehicle sensor 20 is the error include a case where the in-vehicle sensor 20 is malfunctioned, and a case where the in-vehicle sensor 20 is not malfunctioned but cannot output a correct signal due to some circumstances. As an example of the latter, the GNSS receiver 24 may be unable to receive navigation signals from the required number of navigation satellites due to the peripheral environment. As another example of the latter, a sensor that detects the driver's state may not be able to detect the driver's condition (for example, the driver's face) due to the driver's posture or the like. Further, when the driver's state detected by the sensor detecting the driver's state is a state where the vehicle control cannot continue, such as a state where the driver is not holding the steering wheel, the information output by the sensor detecting the driver's state may be determined as the error.

The fourth condition for determining the failure is that a warning is issued for the vehicle 2. The warning for the vehicle 2 includes rear-end collision warning, collision warning, inter-vehicle distance warning, and the like. This warning is issued when the behavior of the vehicle suddenly changes, such as when a sudden steering wheel, sudden start, sudden acceleration, or sudden stop occurs.

The fifth condition for determining the failure is that a market complaint has occurred. This fifth condition, unlike the other conditions described above, includes manual acquisition of information. The fifth condition becomes available for use in the determination by the failure determination unit 61 by inputting information regarding market complaints to the server 80 or the like via a person. Routes for obtaining market complaints include, for example, a regular route and a non-regular route. The regular route is a communication route from an end user to a vehicle manufacturer or dealer, a route based on internal information from organizations including vehicle manufacturers, and an information route from public agencies. The non-regular route is a route that can be obtained by a person inputting information obtained from a user community, social networking service, and the like into the server 80 or the like. The social networking service allows registered users to access and provide information. According to this irregular route, it is possible to widely pick up information using social networking services that has not yet been publicly disclosed.

Figure 3:
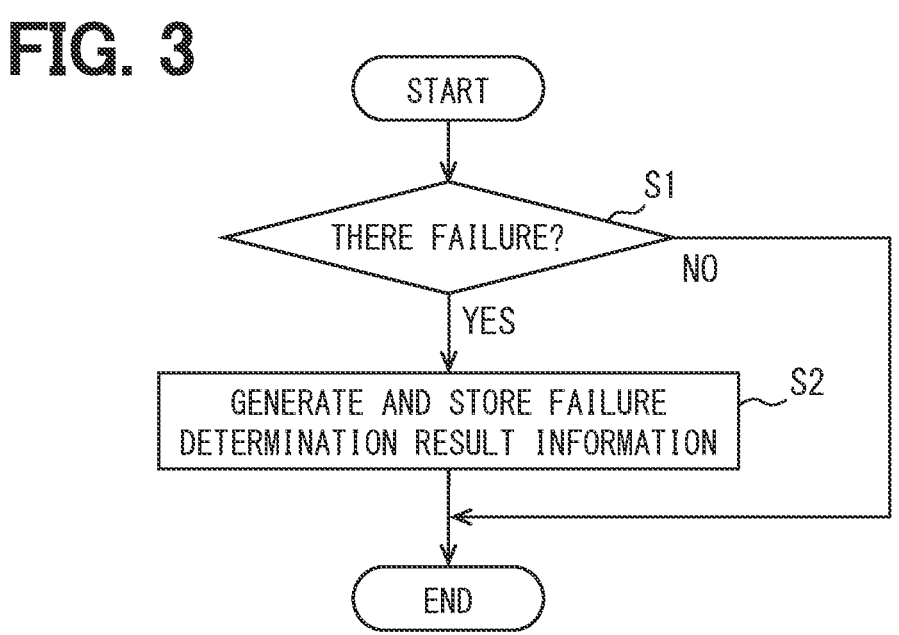
FIG. 3 is a diagram showing a process executed by a failure determination unit 61.
Figure 4:
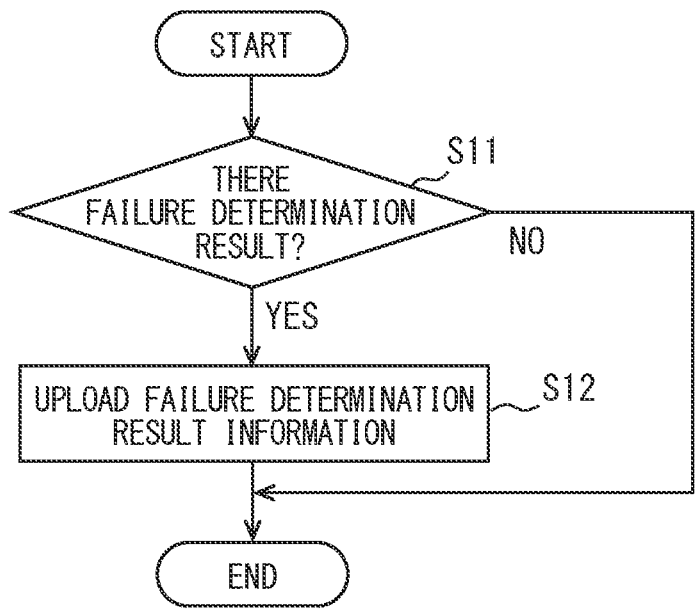
FIG. 4 is a diagram showing a process executed by the failure determination unit 61.

FIGS. 3 and 4 are flowcharts showing processes executed by the failure determination unit 61. The failure determination unit 61 executes the process shown in FIG. 3 at a predetermined cycle when the vehicle control for determining the failure is being executed. In S1, it is determined whether there is the failure in the vehicle control being executed. One or more conditions for determining that there is the failure in the vehicle control are set for each type of vehicle control.

When it is determined that there is no failure, the determination result in S1 becomes NO. When the determination result in S1 is NO, the process of FIG. 3 ends. When the process in FIG. 3 ends and the vehicle control is continuing, the process in FIG. 3 restarts after a predetermined period.

When the determination result of S1 is YES, the process proceeds to S2. In S2, failure determination result information is generated and stored in a predetermined storage. The failure determination result information includes the determination result of S1. Further, the failure determination result information includes information specifying the details of the vehicle control that has been determined to have the failure. The information specifying the details of the vehicle control is, for example, the name of the specific vehicle control, such as traffic light stop control and lane keeping control. The failure determination result information includes position specifying information that identifies the position of the vehicle 2 when the failure occurs. An example of the position specifying information is coordinates. Another example of the position specifying information is the road link or lane link on which the vehicle 2 is traveling when the failure occurs. When the vehicle 2 is positioned at an intersection when the failure occurs, the position specifying information may be the name of the intersection.

Further, the failure determination result information may include one or more of the time and date when the failure occurred, information indicating which condition was used to determine the failure, weather, and version information of the map DB.

The failure determination unit 61 executes the process shown in FIG. 4 at an arbitrarily set upload timing. The upload timing is, for example, every time vehicle control ends. Further, the upload timing may be when the vehicle 2 starts, that is, when the ignition switch is turned on. Further, the upload timing may be every time the process shown in FIG. 3 ends.

In FIG. 4, in S11, it is determined whether the failure determination result information is stored. When the determination result in S11 is NO, the process of FIG. 4 ends. When the determination result of S11 is YES, the process proceeds to S12.

In S12, the stored failure determination result information is uploaded from the vehicle communication unit 40 to the server 80. After the upload, the uploaded failure determination result information is deleted from the storage.

The following description returns to FIG. 2. When the vehicle communication unit 40 receives an inspection instruction from the server 80, the inspection unit 62 performs an inspection according to the inspection instruction. The inspection target includes the map DB. That is, the inspection unit 62 inspects whether the map DB stored in the storage 30 is correct. Further, the inspection target may include vehicle control executed by the vehicle controller 50.

Specifically, the inspection of the map DB includes comparing the map DB stored in the storage 30 with recognition map information generated from information detected by the periphery detection sensor 21 mounted on the vehicle 2.

The inspection instruction designates an area in the map DB that should be inspected to determine whether the map information is correct. The designated area may be a relatively large area, such as a section of a road, or a relatively narrow area, such as an intersection. When the inspection unit 62 acquires an inspection instruction from the vehicle communication unit 40 and the vehicle travels in the area indicated by the inspection instruction, the inspection unit 62 generates the recognition map information from the information detected by the periphery detection sensor 21 in the area indicated by the inspection instruction.

The recognition map information is, for example, the position and shape of lane marking. However, the specific correspondence between the recognition map information and the map information can be set arbitrarily. Preferably, the inspection unit 62 generates as much recognition map information as possible from the information detected by the periphery detection sensor 21. This is because it is possible to determine whether the map DB is correct for more map information.

When the inspection instruction includes information specifying vehicle control, the inspection unit 62 executes the vehicle control specified by the inspection instruction in the section designated by the inspection instruction. Then, it is determined whether there is the failure with the executed vehicle control. The process for determining whether there is the failure in vehicle control may be the same as the process executed by the failure determination unit 61.

When the inspection instruction includes inspection map data, a portion of the map DB that corresponds to the inspection map data is updated with the inspection map data. After that, inspection is performed for determining whether the failure is in the vehicle control. In this case, when updating the map DB does not cause the failure in the vehicle control, it can be assumed that the cause of the failure is in the map information. In addition, when the failure occurs in the vehicle control even after updating the map DB, it can be assumed that the cause of the failure lies in something other than the map information.

The inspection instruction may also include conditions such as weather and time of day as conditions for inspection. The inspection unit 62 inspects the vehicle control or the map DB while satisfying the conditions indicated in the inspection instruction.

The inspection unit 62 transmits the inspection results from the vehicle communication unit 40 to the server 80. An example of the inspection result is information indicating a difference between the recognition map information and the information corresponding to the recognition map information among the information in the map DB stored in the storage 30. When the recognition map information is the lane marking, this is the distance between link end points of the lane marking that is the recognition map information and the lane marking in the map DB, which are mutually the same link. Further, the inspection result may be information before calculating the information indicating the difference described above. That is, the inspection result may be the recognition map information and information corresponding to the recognition map information in the map DB stored in the storage 30. Further, as long as the server 80 can manage the map DB stored in the storage 30 using version information or the like, the inspection result may have the version of the recognition map information and the map DB.

When the vehicle communication unit 40 receives the update map data, the map update unit 63 updates the map DB stored in the storage 30 using the update map data. The update map data is distributed from the server 80.

Configuration of Server 80

FIG. 5 shows a configuration of the server 80. The server 80 includes a server communication unit 81, a storage 82, and a server controller 83. The server communication unit 81 is a communication unit that communicates with the vehicle communication unit 40 via the communication line network 3. The server communication unit 81 may be connected to the communication line network 3 by wire or wirelessly.

The storage 82 stores a distribution map DB. The distribution map DB is a database that stores the map to be distributed to the vehicle 2 in order to update part or all of the map DB stored in the storage 30 of the vehicle 2.

The server controller 83 can be implemented by a configuration including at least one processor. For example, the server controller 83 can be implemented by a computer including a processor, a non-volatile memory, RAM, I/O, and a bus line connecting these configurations. The non-volatile memory stores a program for operating a general-purpose computer as the server controller 83. By the processor executing the program stored in the non-volatile memory while utilizing the temporary storage function of the RAM, the server controller 83 operates as an inspection necessity determination unit 84, an inspection instruction unit 85, and an update determination unit 86. Execution of the operations corresponds to execution of a method implemented by the program.

The inspection necessity determination unit 84 determines whether to inspect the cause of the failure based on the failure determination result information received from the vehicle 2. Whether to inspect the cause of the failure is determined by area. The areas can be determined by type of vehicle control. For example, when the vehicle control is signal stop control, the distance can be set to a certain distance in the periphery of an intersection set to include a traffic light that is present at the intersection and behind the intersection. When the vehicle control is the lane keeping control or the lane change control, the area is determined to include the road link or lane link where a failure has occurred in the lane keeping control or lane change control.

The inspection necessity determination unit 84 can statistically process the failure determination result information transmitted from the plurality of vehicles 2 to determine whether to inspect the cause of the failure. For example, when a certain number of failure determination information indicating that there is a defect in the same type of vehicle control is received within a preset period, it is determined that the cause of the failure should be inspected. The above certain time may be changed depending on the type of road, such as an expressway or a general road. The road type may be determined based on the position specifying information in the failure determination result information and the distribution map DB stored in the storage 82. Further, a certain period may be determined depending on the traffic volume.

Furthermore, it may be possible to consider the conditions under which the failure was determined, as indicated by the failure determination result information. For example, when determining whether the cause of the failure is the map DB, the failure determination result information, in which the condition for determining the failure is that the information output by the in-vehicle sensor 20 is an error, may not be regarded as the failure determination result information.

The inspection necessity determination unit 84 does not necessarily need to statistically process the failure determination result information transmitted from the plurality of vehicles 2. It may be determined at regular intervals whether to inspect the cause of the failure based on the first received failure determination result information. In this case, when the failure determination result information is received within a certain period, it can be determined that the cause of the failure should be inspected. This determination can be made for each content of vehicle control.

Further, it may be determined that the failure cause inspection is executed when, in a case of receiving the failure determination result information within a certain period, the satisfied condition for the failure determination in the failure determination result information is not a condition that the information output by the in-vehicle sensor 20 is the error. In other words, it may be determined that the failure cause is to be inspected in a case where the condition that is met when the failure is determined is the first condition or the second condition described above. By comparison with the first, second, and third conditions described above, when the first and second conditions are satisfied, the map DB is more likely to be defective than when the third condition is satisfied.

The inspection instruction unit 85 transmits an inspection instruction to one or more in-vehicle systems 10 to instruct the failure cause to be inspected when the inspection necessity determination unit 84 determines to inspect the failure cause. One of the purposes of the inspection is to determine whether the cause of the failure is in the map DB. Accordingly, the inspection instruction includes information indicating the area of the map to be inspected. The designated area is the inspection necessary area determined by the inspection necessity determination unit 84, or a wider area that is set to include the area. The information indicating the area may be one or more coordinates that specify the area, such as the center of the area.

The inspection instruction unit 85 may transmit the inspection instruction to all the in-vehicle systems 10 with which it can communicate. Alternatively, the inspection instruction may be transmitted to in-vehicle systems 10 that exist in the periphery of the inspection area designated by the inspection instruction.

The inspection instruction can include information specifying the vehicle control to be inspected. When specifying the vehicle control to be inspected, conditions for executing the vehicle control, such as time of day and weather, can be included. Further, the inspection instruction may include map data for the area designated in the inspection instruction extracted from the distribution map DB for inspection.

When the in-vehicle system 10 receives the inspection instruction and the inspection unit 62 performs the inspection according to the inspection instruction, the in-vehicle system 10 transmits the inspection result to the server 80. The update determination unit 86 of the server 80 determines whether it is necessary to update the map DB based on the inspection result. More precisely, the update determination unit 86 determines whether it is necessary to update the map information in the map DB according to the inspection instruction. In the map DB, the map information is updated based on the inspection instruction, and also the map DB is updated. Hereinafter, "updating the map DB" may mean updating, in the map DB, the map information according to the inspection instruction. The update determination unit 86 determines that it is necessary to update the map DB when it can be determined from the inspection result that the map DB is incorrect.

For example, the update determination unit 86 statistically processes the inspection result received from a plurality of vehicles 2 and determines whether it is necessary to update the map DB. In one example, when the update determination unit 86 acquires a preset number of inspection results, the ratio of inspection results indicating that the map DB is correct among the acquired inspection results is greater than or equal to a threshold value, the map DB is correct. Therefore, it is determined that the map DB is not updated. In this case, it can be estimated that the failure cause in the vehicle control is a cause other than the map DB.

When the ratio of inspection results indicating that the map DB is correct is smaller than the threshold, the update determination unit 86 determines that it is necessary to update the map DB. When it is determined that the update of the map DB is necessary, it is assumed that the failure cause of the vehicle control is in the map DB.

When the update determination unit 86 determines that it is necessary to update the map DB, it generates the update map data from the distribution map DB stored in the storage 82. Then the generated update map data is transmitted to the in-vehicle system 10 that has transmitted the determination result that the vehicle control has the failure. When the vehicle communication unit 40 receives this update map data, the map update unit 63 updates the map DB. Note that the update map data may be transmitted in a broadcast manner without specifying a receiving party. When transmitting update map data in a broadcast manner, the receiver determines whether to update the update map data based on the version or the like of the update map data.

Figure 6:
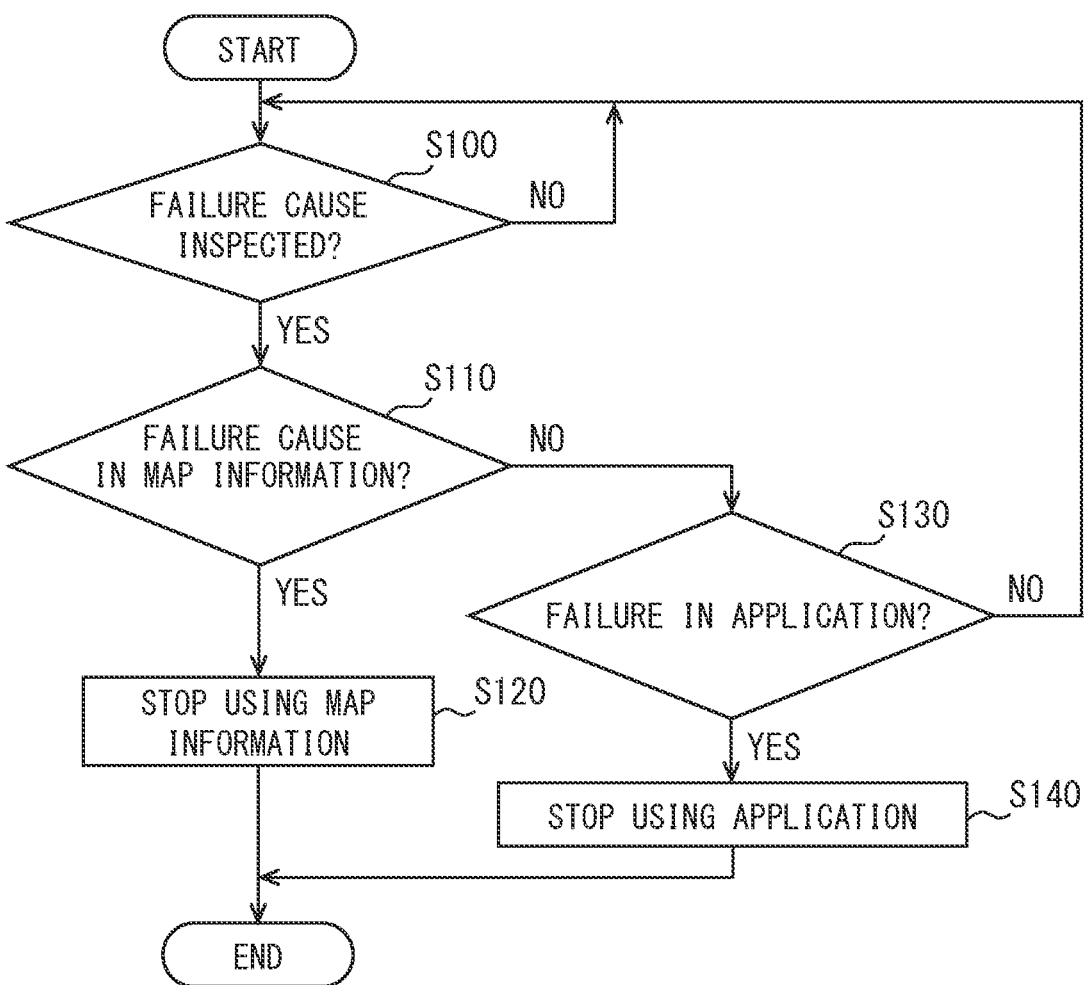
FIG. 6 is a flowchart regarding stop of use of map information and stop of application use.

FIG. 6 shows a flowchart regarding the stop of use of map information and the stop of application use. The inspection necessity determination unit 84 executes the process shown in S100 in FIG. 6 at a predetermined cycle while acquiring the failure determination result information. In S100, it is determined whether to inspect the failure cause, as described above, based on the failure determination result information. When it is determined not to inspect the failure, the determination result in S100 becomes NO. When the determination result in S100 is NO, the process in S100 is repeatedly executed.

When the determination result of S100 is YES, the process proceeds to S110. In S110, the update determination unit 86 statistically processes the inspection results transmitted from the vehicle 2 or from a plurality of vehicles 2 to determine whether the failure cause is in the map information. When it is determined that the failure cause is in the map information, the determination result in S110 becomes YES. When the determination result of S110 is YES, the process proceeds to S120. In S120, the map update system 1 executes a process to stop the use of map information. The in-vehicle system 10 may perform display showing that the process of S120 has been executed for the user of the vehicle 2, or audibly notify the user of those. After execution of the process in S120, the process in FIG. 6 ends. When the process in FIG. 6 ends and the vehicle control is continuing, the process in FIG. 6 restarts after a predetermined period.

When it is determined that the failure cause is not in the map information, the determination result in S110 becomes NO. When the determination result in S110 is NO, the process proceeds to S130. In S130, the in-vehicle device 60 or the failure determination unit 61 determines whether there is a failure in the application of the vehicle 2. In S130, it is determined whether a functional part of the application is not operating normally, there is the failure in the display of driving status or driving assistance, or there is other failures. The application is software related to automated driving control or driving assistance control of the vehicle 2 executed by the vehicle controller 50. The application is software that is installed in the vehicle 2 and can be operated and visually recognized by the user in the vehicle 2. The automated driving control or driving assistance control includes, for example, constant speed traveling control, inter-vehicle distance control, automatic parking control, lane change control, intersection driving control, and the like. The application is used in the vehicle and is an application related to automated driving or driving assistance of the vehicle 2. The application provides display or audio guidance for route guidance, or signs and features related to automated driving or driving assistance.

When it is determined that there is no failure in the application, the determination result in S130 is NO. When the determination result in S130 is NO, the process returns to S100. When it is determined that there is the failure in the application, the determination result in S130 is YES. When the determination result of S130 is YES, the process proceeds to S140. In S140, the in-vehicle device 60 executes a process to stop using the application. The in-vehicle device 60 may perform display showing that the process of S140 has been executed for the user of the vehicle 2, or audibly notify the user of those. After execution of the process in S140, the process in FIG. 6 ends. When the process in FIG. 6 ends and the vehicle control is continuing, the process in FIG. 6 restarts after a predetermined period.

Figure 7:
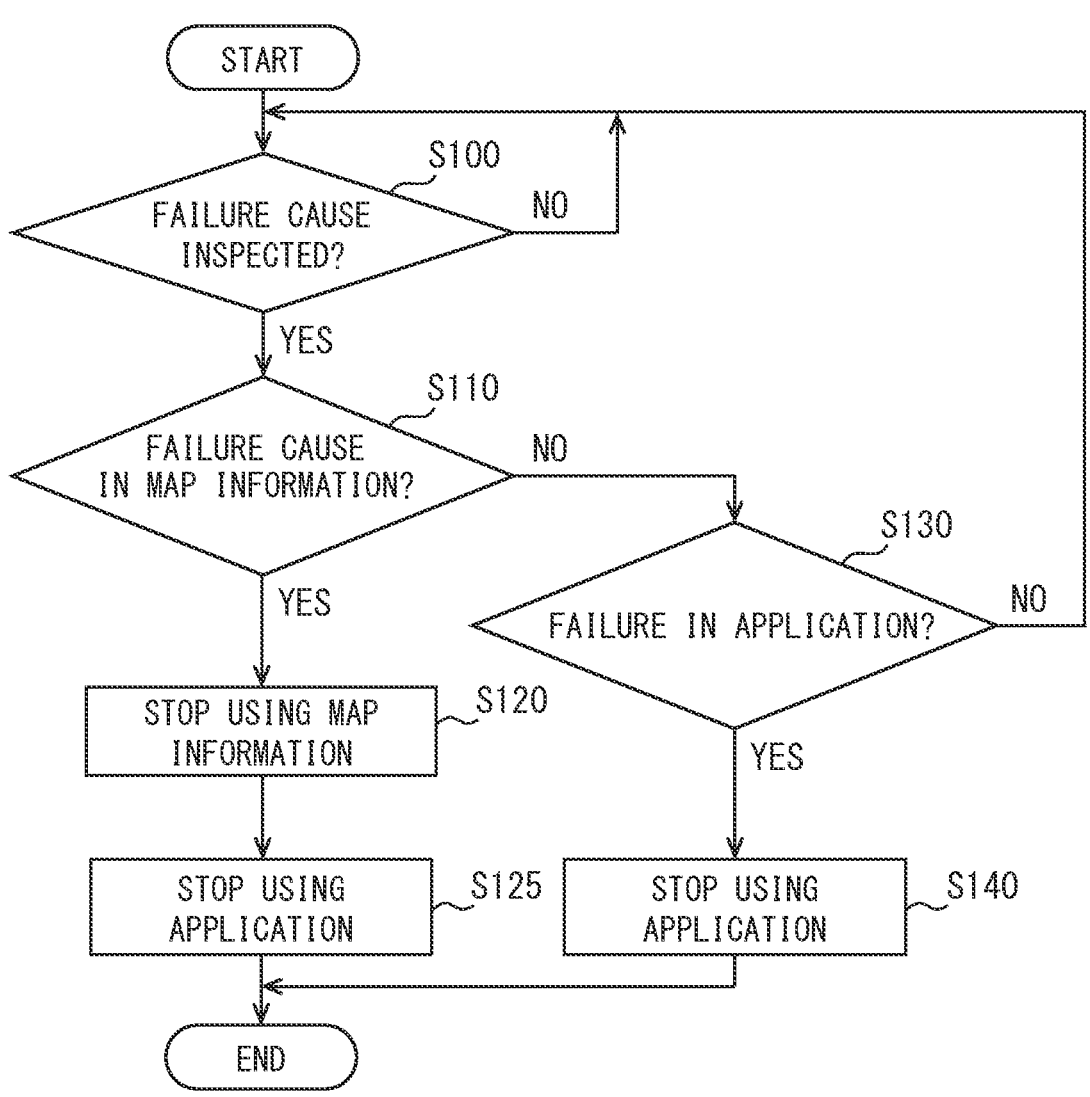
FIG. 7 is a flowchart regarding the stop of use of map information and the stop of application use.

FIG. 7 shows a flowchart regarding the stop of use of map information and the stop of application use. The process shown in FIG. 7 differs from FIG. 6 in that S125 is executed. As shown in FIG. 7, when the determination result in S110 is YES, the process in S125 may be executed in addition to the process in S120. In S125, the in-vehicle device 60 executes the process to stop using the application. The in-vehicle device 60 may perform display showing that the process of S125 has been executed for the user of the vehicle 2, or audibly notify the user of those. After execution of the process in S125, the process in FIG. 6 ends. Through this process, when the update determination unit determines that there is the failure in the map information, it is possible to stop using the application related to automated driving or driving assistance.

Overview of Embodiment

In the map update system 1 of the present embodiment described above, the update determination unit 86 determines whether it is necessary to update the map DB based on the inspection result transmitted from the in-vehicle system 10. The inspection result is a result obtained in response to the inspection instruction, and the inspection instruction is issued when there is the failure in the vehicle control. Accordingly, determining that it is necessary to update the map DB based on the inspection result means determining that it is necessary to update the map information based on determination that the failure cause of the vehicle control is in the map information.

Therefore, when there is no failure in the vehicle control executed by the vehicle controller 50, it can be determined that the update of the map DB is not necessary even if the map DB is not the latest. Accordingly, it is possible to prevent the non-essential update of the map DB.

Further, the failure determination unit 61 determines that there is the failure in the vehicle control performed by the vehicle controller 50 when the driver of the vehicle 2 performs the vehicle operation that changes the vehicle control by the vehicle controller 50. When there is the failure in the vehicle control, the driver often performs the vehicle operation that changes the vehicle control. Therefore, the failure determination unit 61 can reduce the number of cases in which it cannot be determined that there is the failure even though there is the failure in vehicle control.

The failure determination unit 61 determines that there is the failure in the vehicle control executed by the vehicle controller 50 based on the difference between the map-based control information and the sensor-based control information. By determining whether there is the failure in the vehicle control in this way, it is possible to reduce the number of cases where it cannot be determined that there is the failure even though there is the failure in the vehicle control due to map information.

The failure determination unit 61 determines that there is the failure in vehicle control based on the error of the information output by the in-vehicle sensor 20. By determining whether there is the failure in the vehicle control in this way, It is possible to prevent a situation where a failure that may account for a certain percentage of vehicle control failures cannot be determined as the failure.

The map update system 1 includes the in-vehicle device 60 and the server 80. The in-vehicle device 60 includes the failure determination unit 61. The server 80 includes the inspection necessity determination unit 84, the inspection instruction unit 85, and the update determination unit 86. The update determination unit 86 can determine whether it is necessary to update the map DB by acquiring the failure determination result information from the plurality of in-vehicle devices 60. Further, the inspection necessity determination unit 84 determines whether to inspect the cause of the failure based on the failure determination result information. When the inspection necessity determination unit 84 determines that the defect will not be inspected, the inspection instruction unit 85 does not transmit the inspection instruction to the in-vehicle device 60. According to this configuration, it is possible to prevent the cause of the failure from being inspected even when there is no need to inspect the cause of the failure.

The failure determination result information includes information specifying the details of the vehicle control. Thereby, the inspection necessity determination unit 84 can specify the details of vehicle control and determine whether it is necessary to inspect the cause of the failure.

The failure determination result information includes position specifying information that identifies the position of the vehicle 2 when the failure occurs. Thereby, the inspection necessity determination unit 84 can specify the area to be inspected for the failure and determine whether it is necessary to inspect the cause of the failure.

When acquiring the failure determination result information from the plurality of vehicles 2, the inspection necessity determination unit 84 statistically processes the plurality of failure determination result information to determine whether to inspect the cause of the failure. Accordingly, the accuracy of determining whether to inspect the cause of the failure increases.

The update determination unit 86 statistically processes the inspection results transmitted from the plurality of vehicles 2 to determine whether the failure cause is in the map information. Accordingly, the accuracy of determining whether the cause of the failure is in the map information increases.

The map update system 1 stops the use of the map information when the update determination unit 86 determines that there is the failure cause in the map information. Thereby, it is possible to avoid the behavior control of the vehicle 2 using map information in which the failure has occurred.

When the update determination unit 86 determines that there is the failure in the map information, the map update system 1 stops the application related to automated driving or driving assistance of the vehicle 2. Thereby, it is possible to avoid the use of the application using map information in which the failure has occurred.

In the case where the update determination unit 86 determines that there is not the failure in the map information, when there is the failure in the application related to automated driving or driving assistance of the vehicle 2, the map update system 1 stops the application. Thereby, it is possible to avoid using the application that causes the failure, regardless of whether there is the failure in the map information.

Although the embodiment of the present disclosure has been described above, the present disclosure is not limited to the above embodiment, and various modifications described below are also included in the technical scope of the present disclosure. Furthermore, various modifications other than the following can be made without departing from the gist. In the following description, elements having the same reference symbols as the elements described in the above embodiment refer to the same element, except a specific explanation is made. When only a part of the configuration is described, the embodiment described above can be applied to remaining parts of the configuration.

First Modification

In the embodiment, the failure determination unit 61 generates the failure determination result information only when it is determined that there is the failure in the vehicle control. However, even when the failure determination unit 61 determines that there is no failure in the vehicle control, it may generate the failure determination result information indicating this determination.

In both of the case where there is the failure in the vehicle control and the case where there is no failure, when generating the failure determination result information, the inspection necessity determination unit 84 makes the following determination, for example. The inspection necessity determination unit 84 aggregates a certain number of failure determination result information and determines whether to inspect the cause of the failure based on the ratio of failure determination result information indicating that there is the failure in the vehicle control. Note that when the third condition described above, that is, the information output by the in-vehicle sensor 20 is an error, is satisfied, it is unlikely that the map DB is the cause. Therefore, when determining whether to inspect whether the cause of the failure is the map DB, the failure determination result information, which means that the third condition described above is satisfied at the above ratio, may be treated as if there is no failure in the vehicle control.

Second Modification

In the embodiment, the server 80 has been described as being positioned outside the vehicle 2. However, the server 80 may be mounted on the vehicle 2. Therefore, the in-vehicle device 60 may include the functions of the server controller 83, such as the update determination unit 86.

Third Modification

In the embodiment, it has been described that the inspection necessity determination unit 84 does not need to execute the statistical process. Accordingly, the inspection necessity determination unit 84 may be omitted, and the inspection instruction unit 85 may issue the inspection instruction when the failure determination unit 61 determines that there is the failure in the vehicle control.

Fourth Modification

When the map-based control information and the sensor-based control information are different, the failure is highly likely to be in the map DB. In this way, the cause of the failure is highly likely to be in the vehicle control lies in the map DB, the inspection necessity determination unit 84, the inspection instruction unit 85, and the inspection unit 62 may be omitted, and the update determination unit 86 may determine that the cause of the failure is in the map information. In this fourth modification as well, the failure determination unit 61 determines whether the map-based control information used for vehicle control and the corresponding sensor-based control information are different. Even in a case where the map DB does not accurately represent real roads and features, when the map information that does not correctly represent real roads and features is not used for vehicle control, the failure determination unit 61 may not determine that the failure is in the vehicle control. For example, in the lane change control, it is necessary to distinguish whether a lane marking is a solid line or a broken line. However, the color of the solid line is not used. Accordingly, in the aspect of the fourth Modification as well, it is possible to prevent the update of the map information that is not essential.

Fifth Modification

The update determination unit 86 does not necessarily need to statistically process the inspection results. The update determination unit 86 may determine whether to update the map DB based on only one inspection result.

Sixth Modification

The failure determination result information described in the embodiment includes information specifying the details of vehicle control and information specifying the position of the vehicle 2. However, the failure determination result information may not include one or both of the information specifying the details of vehicle control and the information specifying the position of the vehicle 2. Even in this case, unless the failure determination unit 61 determines that the failure is in the vehicle control, the update determination unit 86 does not determine to update the map information, so it is possible to prevent the update of map information that is not essential.

Seventh Modification

In the embodiment, the map update unit 63 of the in-vehicle device 60 updates the map DB online based on the update map data distributed from the server 80. However, the map DB may be updated offline.

The invention claimed is:

1. A map update system for determining whether an update of map information that is stored in a storage of a vehicle and used by a vehicle controller configured to control behavior of the vehicle is necessary, the map update system comprising:

a failure determination unit configured to determine whether a failure is in vehicle control executed by the vehicle controller; and an update determination unit configured to determine that the update of the map information is necessary based on a determination that a cause of the failure is in the map information, wherein the map update system includes a server that includes the update determination unit and communicates with each of a plurality of in-vehicle devices, and the server further includes:

an inspection necessity determination unit configured to determine whether to inspect a cause of the failure based on failure determination result information received from the vehicle; and an inspection instruction unit configured to transmit, to at least one in-vehicle device among the plurality of in-vehicle devices, an inspection instruction for instructing the at least one in-vehicle device to inspect the cause of the failure when the inspection necessity determination unit determines to inspect the cause of the failure, and the update determination unit is configured to determine whether the update of the map information is necessary based on an inspection result transmitted from the vehicle.

2. The map update system according to claim 1, wherein the failure determination unit is configured to determine that the failure is in the vehicle control executed by the vehicle controller based on an operation that is performed by a driver of the vehicle and changes the vehicle control by the vehicle controller.

3. The map update system according to claim 1, wherein the failure determination unit is configured to determine that the failure is in the vehicle control executed by the vehicle controller based on a difference between map-based control information that is set based on the map information stored in the storage and used for the vehicle control by the vehicle controller and sensor-based sensor information that is set based on information detected by a periphery detection sensor mounted on the vehicle and corresponds to the map-based control information.

4. The map update system according to claim 1, wherein the vehicle controller is configured to acquire, from an in-vehicle sensor mounted on the vehicle, at least one of information indicating the behavior of the vehicle or information indicating an object existing in a periphery of the vehicle, and control the behavior of the vehicle, and the failure determination unit determines the failure is in the vehicle control executed by the vehicle controller when information output by the in-vehicle sensor is an error.

5. The map update system according to claim 1, wherein the vehicle includes a plurality of vehicles, the map update system includes a plurality of in-vehicle devices that include the failure determination unit and is mounted on the plurality of vehicles, the failure determination unit is configured to transmit, to the server from a vehicle communication unit, failure determination result information indicating whether the failure is in the vehicle control, the at least one in-vehicle device includes an inspection unit configured to, when receiving the inspection instruction, compare the map information stored in the storage with recognition map information generated based on information detected by a periphery detection sensor mounted on the vehicle to determine, for inspection, whether the map information stored in the storage is correct, and transmit an inspection result from the vehicle communication unit to the server.

6. The map update system according to claim 5, wherein the failure determination result information includes information specifying a content of the vehicle control.

7. The map update system according to claim 5, wherein the failure determination result information includes position specifying information specifying a failure occurrence position of the vehicle.

8. The map update system according to claim 5, wherein when acquiring the failure determination result information from the plurality of vehicles, the inspection necessity determination unit is configured to statistically process the failure determination result information to determine whether to inspect the cause of the failure.

9. The map update system according to claim 5, wherein the update determination unit is configured to statistically process the inspection result transmitted from the plurality of vehicles, and determine whether the cause of the failure is in the map information.

10. The map update system according to claim 9, wherein the map update system stops using the map information when the update determination unit determines that the cause of the failure is in the map information.

11. The map update system according to claim 9, wherein the map update system stops using an application related to automated driving of the vehicle or driving assistance when the update determination unit determines that the cause of the failure is in the map information.

12. The map update system according to claim 9, wherein the map update system stops using an application related to automated driving of the vehicle or driving assistance when the update determination unit determines that the cause of the failure is not in the map information and is in the application.

13. The map update system according to claim 1, further comprising:

a processor; and a memory coupled to the processor and storing program instructions that when executed by the processor cause the processor to serve as: the failure determination unit; and the update determination unit.

14. An in-vehicle device comprising:

a failure determination unit configured to determine whether a failure is in vehicle control executed by a vehicle controller configured to control behavior of a vehicle using map information stored in a storage of the vehicle, and transmit failure determination result information indicating a determination result from a vehicle communication unit to a server; and an inspection unit configured to, when receiving an inspection instruction from the server, compare the map information stored in the storage with recognition map information generated based on information detected by a periphery detection sensor mounted on the vehicle to determine, for inspection, whether the map information stored in the storage is correct, and transmit an inspection result from the vehicle communication unit to the server.

15. The in-vehicle device according to claim 14, further comprising:

a processor; and a memory coupled to the processor and storing program instructions that when executed by the processor cause the processor to serve as: the failure determination unit; and the inspection unit.

16. A server comprising:

an inspection necessity determination unit configured to receive failure determination result information that is information indicating a determination result of whether a failure is in vehicle control by a vehicle controller configured to control behavior of a vehicle using map information stored in a storage mounted on the vehicle; and an inspection instruction unit configured to transmit, to at least one in-vehicle device, an inspection instruction for instructing the at least one in-vehicle device to inspect a cause of the failure when the inspection necessity determination unit determines to inspect the cause of the failure, wherein the vehicle includes a plurality of vehicles, and the server further includes an update determination unit configured to, when receiving the failure determination result information from the plurality of vehicles, statistically process the failure determination result information from the plurality of vehicles, determine whether the cause of the failure is in the map information, and determine to update the map information based on a determination that the cause of the failure is in the map information.

17. The server according to claim 16, further comprising:

a processor; and a memory coupled to the processor and storing program instructions that when executed by the processor cause the processor to serve as: the inspection necessity determination unit; the inspection instruction unit; and the update determination unit.

\*    \*    \*    \*    \*